United States Patent
Amit et al.

(10) Patent No.: US 9,389,795 B2
(45) Date of Patent: *Jul. 12, 2016

(54) DIVIDING INCOMING DATA INTO MULTIPLE DATA STREAMS AND TRANSFORMING THE DATA FOR STORAGE IN A LOGICAL DATA OBJECT

(71) Applicant: INTERNATIONAL BUSINESS MACHINES CORPORATION, Armonk, NY (US)

(72) Inventors: Jonathan Amit, Omer (IL); Ori Shalev, Kiryat Ono (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/835,193

(22) Filed: Aug. 25, 2015

(65) Prior Publication Data

US 2015/0363439 A1 Dec. 17, 2015

Related U.S. Application Data

(63) Continuation of application No. 13/209,295, filed on Aug. 12, 2011, now Pat. No. 9,250,821, which is a continuation of application No. 13/006,371, filed on Jan. 13, 2011, now Pat. No. 9,003,110.

(60) Provisional application No. 61/294,573, filed on Jan. 13, 2010.

(51) Int. Cl.
G06F 12/00 (2006.01)
G06F 13/00 (2006.01)
(Continued)

(52) U.S. Cl.
CPC ............... *G06F 3/064* (2013.01); *G06F 3/067* (2013.01); *G06F 3/0608* (2013.01); *G06F 3/0623* (2013.01); *G06F 17/30312* (2013.01); *G06F 17/30569* (2013.01)

(58) Field of Classification Search
None
See application file for complete search history.

(56) References Cited

U.S. PATENT DOCUMENTS 5,819,292 A 10/1998 Hitz et al.
5,996,054 A 11/1999 Ledain et al.
(Continued)

FOREIGN PATENT DOCUMENTS

WO 2007138600 A2 12/2007
WO 2007138601 A2 12/2007
WO 2007138602 A2 12/2007

OTHER PUBLICATIONS

Hashing from Hargrave's Communications Dictionary, Wiley, 1 page, 2015.

*Primary Examiner* — Jared Rutz
*Assistant Examiner* — Marwan Ayash
(74) *Attorney, Agent, or Firm* — Griffiths & Seaton PLLC

(57) ABSTRACT

Various embodiments for storing a logical object are provided. In one such embodiment, by way of example only, incoming data is divided corresponding to a logical data object into a plurality of independent streams, associating each data chunk of a plurality of obtained data chunks with a corresponding stream among the plurality of independent streams. At least one of the obtained data chunks and derivatives thereof is sequentially accommodated in accordance with an order the obtained chunks are received, while keeping the association with the corresponding streams. A global index is generated as a single meta-data stream accommodated in the logical data object and comprising information common to the plurality of independent streams and related to mapping between data in the logical data object and the obtained data chunks.

18 Claims, 6 Drawing Sheets

(51) Int. Cl.
*G06F 13/28* (2006.01)
*G06F 17/30* (2006.01)
*G06F 3/06* (2006.01)

(56) References Cited

U.S. PATENT DOCUMENTS

| | | |
|---|---|---|
| 6,148,368 A | 11/2000 | Dekoning |
| 6,535,869 B1 | 3/2003 | Housel, III |
| 6,751,635 B1 | 6/2004 | Chen et al. |
| 6,865,650 B1 | 3/2005 | Morley et al. |
| 2002/0194484 A1* | 12/2002 | Bolosky ............... G06F 21/64 713/189 |
| 2004/0059866 A1 | 3/2004 | Patel et al. |
| 2004/0128470 A1 | 7/2004 | Hetzler et al. |
| 2004/0216091 A1 | 10/2004 | Groeschel |
| 2005/0240628 A1 | 10/2005 | Jiang et al. |
| 2005/0273654 A1 | 12/2005 | Chen et al. |
| 2007/0294565 A1 | 12/2007 | Johnston et al. |
| 2008/0183767 A1 | 7/2008 | Zhu et al. |
| 2008/0270690 A1 | 10/2008 | English |
| 2009/0164535 A1* | 6/2009 | Gandhi ............. G06F 17/30067 |
| 2010/0205369 A1 | 8/2010 | Chang et al. |

* cited by examiner

DIVIDING INCOMING DATA INTO MULTIPLE DATA STREAMS AND TRANSFORMING THE DATA FOR STORAGE IN A LOGICAL DATA OBJECT

CROSS-REFERENCE TO RELATED APPLICATION

This application is a continuation of U.S. patent application Ser. No. 13/209,295, filed on Aug. 12, 2011, which is a continuation of U.S. patent application Ser. No. 13/006,371, now U.S. Pat. No. 9,003,110, filed on Jan. 13, 2011, which claims the benefit under 35 U.S.C. §119(e) of U.S. Provisional Application No. 61/294,573, filed Jan. 13, 2010, all of which are incorporated herein by reference.

FIELD OF THE INVENTION

This invention relates to storage systems, and, in particular, to methods of managing storing data and systems thereof.

BACKGROUND OF THE INVENTION

To meet the growing requirements of today's computer systems, and simultaneously, to achieve flexibility and reliability in the function and configuration of mass storage systems, it is desirable to store data as efficiently as possible in a mass storage system. A constant challenge in a storage industry is to provide a storage system, capable of efficiently performing both random write operations and sequential read operations.

SUMMARY OF THE INVENTION

In accordance with certain aspects of the present invention, various embodiments for storing a logical object are provided. In one such embodiment, by way of example only, incoming data corresponding to a logical data object is divided into a plurality of independent streams. Each data chunk of a plurality of obtained data chunks is associated with a corresponding stream among the plurality of independent streams. At least one of the obtained data chunks and derivatives thereof is sequentially accommodated in accordance with an order the obtained chunks are received, while keeping the association with the corresponding streams. A global index is generated as a single meta-data stream accommodated in the logical data object and comprising information common to the plurality of independent streams and related to mapping between data in the logical data object and the obtained data chunks.

In addition to the foregoing exemplary embodiment, other system and computer program product embodiments are disclosed and provide related advantages.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
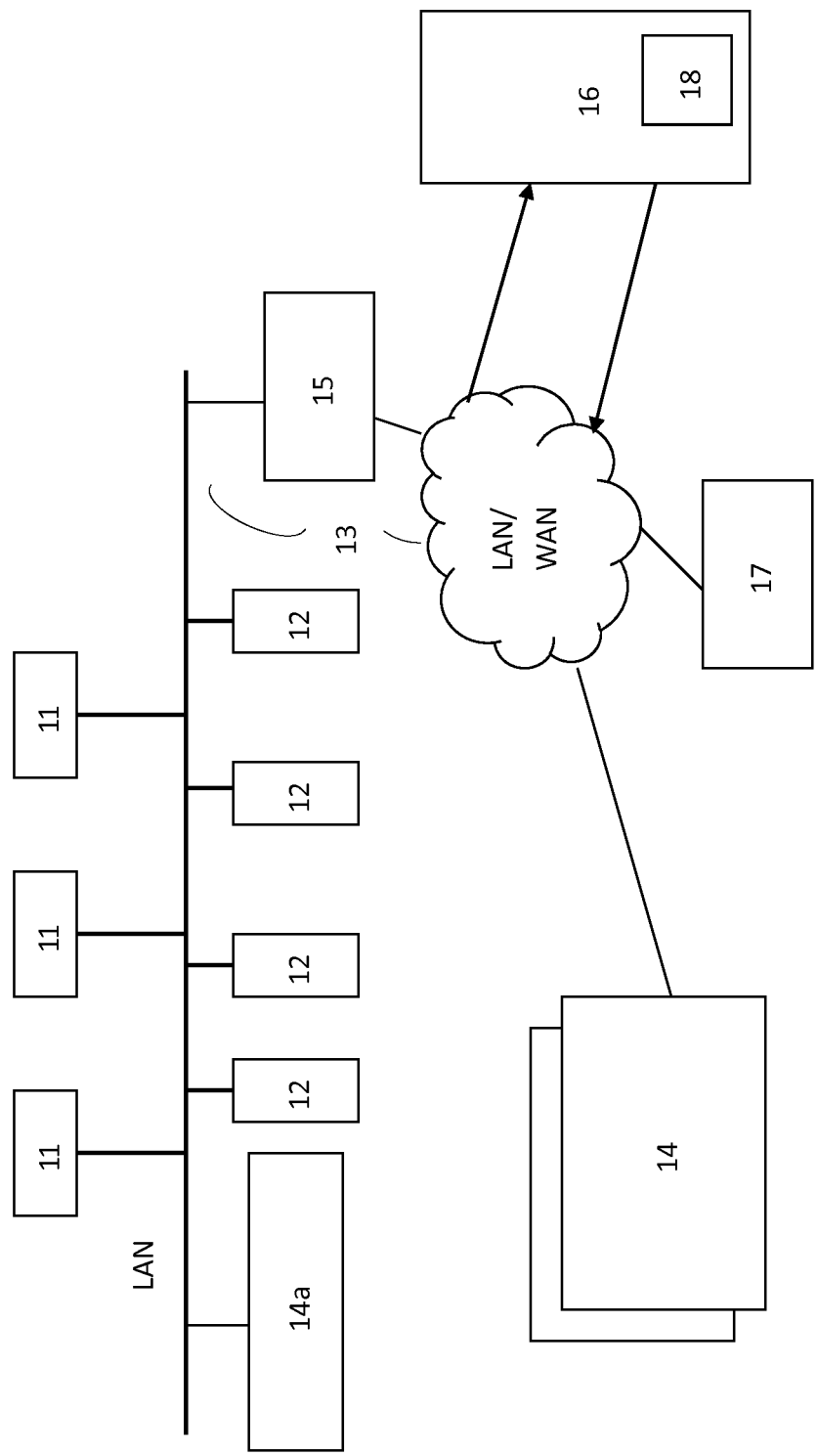
FIG. 1 illustrates a schematic block diagram of typical storage network architecture.

Challenges relating to mass storage systems have been recognized in the Prior Art and various mechanisms have been developed to provide a solution. For example: US Patent Publication No. 2008/270690 discloses a system and method of enhancing performance of updates to sequential block storage of a storage system. According to an aspect of the invention, a disk array of the storage system is utilized to extend write buffers of the system, thereby rendering a portion of the disk array a disk-based log. To that end, one portion of the disk array is organized into a home location array having a set of sequential home locations for disk blocks. Another portion of the disk array is organized into the disk-based log having a set of log buffers configured to store versions of disk blocks that have yet to be returned to their home locations in the home location array. In addition, non-volatile memory of the storage system is organized as an index configured to provide efficient mappings of disk blocks not yet returned to their home locations. In accordance with another aspect of the invention, a novel disk-based multi-level sort procedure is provided to establish locality among updates (write data) held in the disk-based log, thereby enabling the write data to be efficiently written to home locations on the disk array.

US Patent Publication No. 2004/128470 discloses a log-structured write cache for a data storage system and method for improving the performance of the storage system that are described. The system might be a RAID storage array, a disk drive, an optical disk, or a tape storage system. The write cache is preferably implemented in the main storage medium of the system, but can also be provided in other storage components of the system. The write cache includes cache lines where write data is temporarily accumulated in a non-volatile state so that it can be sequentially written to the target storage locations at a later time, thereby improving the overall performance of the system. Meta-data for each cache line is also maintained in the write cache. The meta-data includes the target sector address for each sector in the line and a sequence number that indicates the order in which data is posted to the cache lines. A buffer table entry is provided for each cache line. A hash table is used to search the buffer table for a sector address that is needed at each data read and write operation.

U.S. Pat. No. 6,865,650 discloses a system and method for storing data, the system having one or more storage devices, caches data from a sender into a first random-access structure located in a first cache level, caches data from the first cache level into a log structure located in a second cache level, and stores data from CL into a second random-access structure located in a storage level, wherein CL is the first cache level or the second cache level. In further embodiments of the invention, the second cache level caches in the log structure parity data for the data cached in the log structure. In a still further embodiment of the invention, the storage level stores in the second random-access structure parity data for the data stored in the second random-access structure.

U.S. Pat. No. 6,148,368 discloses a method and apparatus for accelerating write operations logging write requests in a log structured cache and by expanding the log structured cache using a cache-extension disk region. The log structured cache includes a cache memory region partitioned into one or more write cache segments and one or more redundancy-data (parity) cache segments. The cache-extension disk region is a portion of a disk array separate from a main disk region. The cache-extension disk region is also partitioned into segments and is used to extend the size of the log structured cache. The main disk region is instead managed in accordance with storage management techniques (e.g., RAID storage management). The write cache segment is partitioned into multiple write cache segments so that when one is full another can be used to handle new write requests. When one of these multiple write cache segments is filled, it is moved to the cache-extension disk region thereby freeing the write cache segment for reuse. The redundancy-data (parity) cache segment holds redundancy data for recent write requests, thereby assuring integrity of the logged write request data in the log structured cache.

Challenges are also addressed in International Applications WO2007138600, WO2007138601 and WO2007138602 published Dec. 12, 2007 and assigned to the assignee of the present application. The entire contents of PCT applications are hereby incorporated by reference in its entirety.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "activating" or the like, refer to the action and/or processes of a computer that manipulate and/or transform data into other data, said data represented as physical, such as electronic, quantities. The term "computer" should be expansively construed to cover any kind of electronic device with data processing capabilities, including, by way of non-limiting example, personal computers, servers, computing system, communication devices, storage devices, processors (e.g. digital signal processor (DSP), microcontrollers, field programmable gate array (FPGA), application specific integrated circuit (ASIC), etc.) and other electronic computing devices.

The operations in accordance with the teachings herein may be performed by a computer specially constructed for the desired purposes or by a general purpose computer specially configured for the desired purpose by a computer program stored in a computer readable storage medium.

Embodiments of the present invention are not described with reference to any particular programming language. It will be appreciated that a variety of programming languages may be used to implement the teachings of the inventions as described herein.

The term "logical data object (LO)" used in this patent specification should be expansively construed to include any types and granularities of data units used in a computing system and handled as one unit (e.g. data files, archive files, image files, database files, memory data blocks, stream data blocks, predefined segments of files, etc.).

Bearing this in mind, attention is drawn to FIGS. 1-7 illustrating by way of non-limiting example, various embodiments for organizing and maintaining the stored data chunks in accordance with certain embodiments of the present invention. In one such embodiment, the data chunks may be sequentially accommodated in a single storing container (LO) in accordance with an order said chunks received, where each data chunk is associated with a respective segment of the logical object.

By way of non-limiting example, such single container (LO) may be a multimedia file combining video, text, audio, music and/or graphics packet streams. The incoming packets (data chunks) are accommodated in accordance with an order said chunks received, while keeping association with a respective stream.

By way of alternative or additional non-limiting example, the single container may be a transformed logical object comprising sequentially accommodated transformed data chunks. The accommodation is provided in accordance with an order said chunks received/transformed while keeping the association between the data chunks and respective segments of initial logical objects. The transformed data chunks may be accommodated in a log form, journal form, mapping form, or any other form of sequential accommodation.

By way of alternative or additional non-limiting example, the single container may be a single file generated by COM Structured Storage technology developed by Microsoft® as part of its Windows® operating system for storing multiple data objects within a single file.

In accordance with certain embodiments of the present invention, the method of organizing data chunks in such single container comprises Global Indexing, Semi-Persistent Free Block-Management, and Multi-Stream Bounded Recovery.

Indexing of data enables rapid access to the latest log entries corresponding to a particular section. The index resides inside the transformed LO and serves as a map to the data pieces in the journaling stream. Often indexes are themselves implemented with journaling. Since data modifications may be frequent, a fully persistent index may be inefficient to maintain. Therefore, the index is only flushed to the underlying storage periodically. After failure, the index of data that has not been indexed may be reconstructed (recovered) by processing the part of the stream that was about to be indexed. A global index is a single meta-data stream inside the container, which contains information common to the set of data streams. Such information may be block allocation or de-allocation events, meta-data on the indexes meta-data (e.g. start point of index streams for each data stream), etc.

Semi-Persistent Free-Block Management enables re-using free data blocks among the separate data streams. The list of free blocks is global to the container and constantly changing, thus resides in the global index. However, since block allocations and de-allocations are frequent, a fully persistent free block list may affect performance. By having a semi-persistent global index, we reduce the frequency of global index writes, but the free-block list is not always up-to-date in case a failure has occurred. The global free-block list must be reconstructed after failures, but since there are multiple data streams with semi-persistent data, it is hard to tell which blocks are free. Also, it may be inefficient to load the entire set of stream indexes. Therefore, in accordance with certain embodiments of the present invention, the global free-block list is inferred from the global index and the semi-persistent data. A set of semi-persistent data blocks, herein referred to as a "recovery list" may be inferred from an order of de-allocation events in the global index.

Bounded data recovery ensures that the amount of data that has to be processed while reconstructing the stream's index is bounded. Bounded data recovery is achieved by controlling the index flush events, e.g. making them frequent enough. In a case of Multi-Stream Bounded Recovery, it is beneficial for the amount of data to be processed during recovery, i.e. the size of the recovery list, to be controlled. During operation, a Presumed Recovery List is maintained. This list is not used for the recovery process, but maintained only to monitor the future recovery list size in case of failures. When the presumed recovery list is about to be extended beyond the predefined recovery bound, an action is taken to shorten it. Such action may be a stream index flush and/or a global index flush. In rare cases where all blocks in the presumed recovery list are in use, at least one of them has to be discontinued in order to make room for a new block in the list.

FIG. 1 illustrates a schematic block diagram of typical storage network architecture. Attention is drawn to FIG. 1 illustrating a schematic diagram of typical storage network architectures as known in the art. The logical data objects (LO) from clients 11 and/or servers 12 are transferred via network 13 to storage device(s) 14 (e.g. specialized NAS file servers, general purpose file servers, SAN storage, stream storage device, etc.) and/or 14a. The network comprises one or more communication devices 15 (e.g. switch, router, bridge, etc.) facilitating the data transfer. The storage in the illustrated network may be wholly or partly implemented using block mode access and/or file mode access storage protocols. In file mode access, the logical data objects (LOs) are constituted by files, and the network is IP network (e.g. local area network (LAN), wide area network (WAN), and/or a combination thereof, etc.). In block mode access embodiments, the logical data objects are constituted by data blocks, and the network is Storage Area Network (SAN) implementing, for example, Fiber Channel or iSCSI protocols. In certain embodiments the storage device (14a) may be directly connected to a server 12 via block mode access storage protocols (e.g. SCSI, Fiber Channel, etc.). Such Direct Access Storage includes, for example, the internally attached local disk drives or externally attached RAID (redundant array of independent disks) or JBOD (just a bunch of disks), etc.

At least part of the logical data objects may be stored in a transformed form (e.g. a compressed form and/or an encrypted form). Accordingly, they may be transformed (e.g. compressed/decompressed and/or encrypted/decrypted) on a physical and/or logical communication route between the clients/servers and the storage location. The transformation or part thereof may be provided, for example, by the server 12, by the communication device 15, by a transformation system 16 operatively coupled to the clients/servers and the storage device, by the storage device 14, etc. Typically the secure keys used for encryption are held separately from the device providing encryption and/or storage, for example, they may be held at a key holding platform 17 operatively coupled with the transformation platform 16. Likewise, coding tables and similar external data involved in the transformation process may be held separate from the processing and/or storage devices. In certain embodiments of the invention, the transformation system 16 may comprise maintenance unit 18 responsible for various maintenance tasks such as, for example, space optimization.

Note that the invention is not bound by the specific architecture described with reference to FIG. 1-7. Those versed in the art will readily appreciate that the invention is, likewise, applicable to any computing systems and any storage network architecture facilitating transformation of one or more logical data objects on a physical and/or logical route between a computer sending data access request to the logical data object and a storage location of the appropriate transformed data, including embodiments wherein transformation system is integrated with the communication device, client/server and/or storage device.

Figure 2:
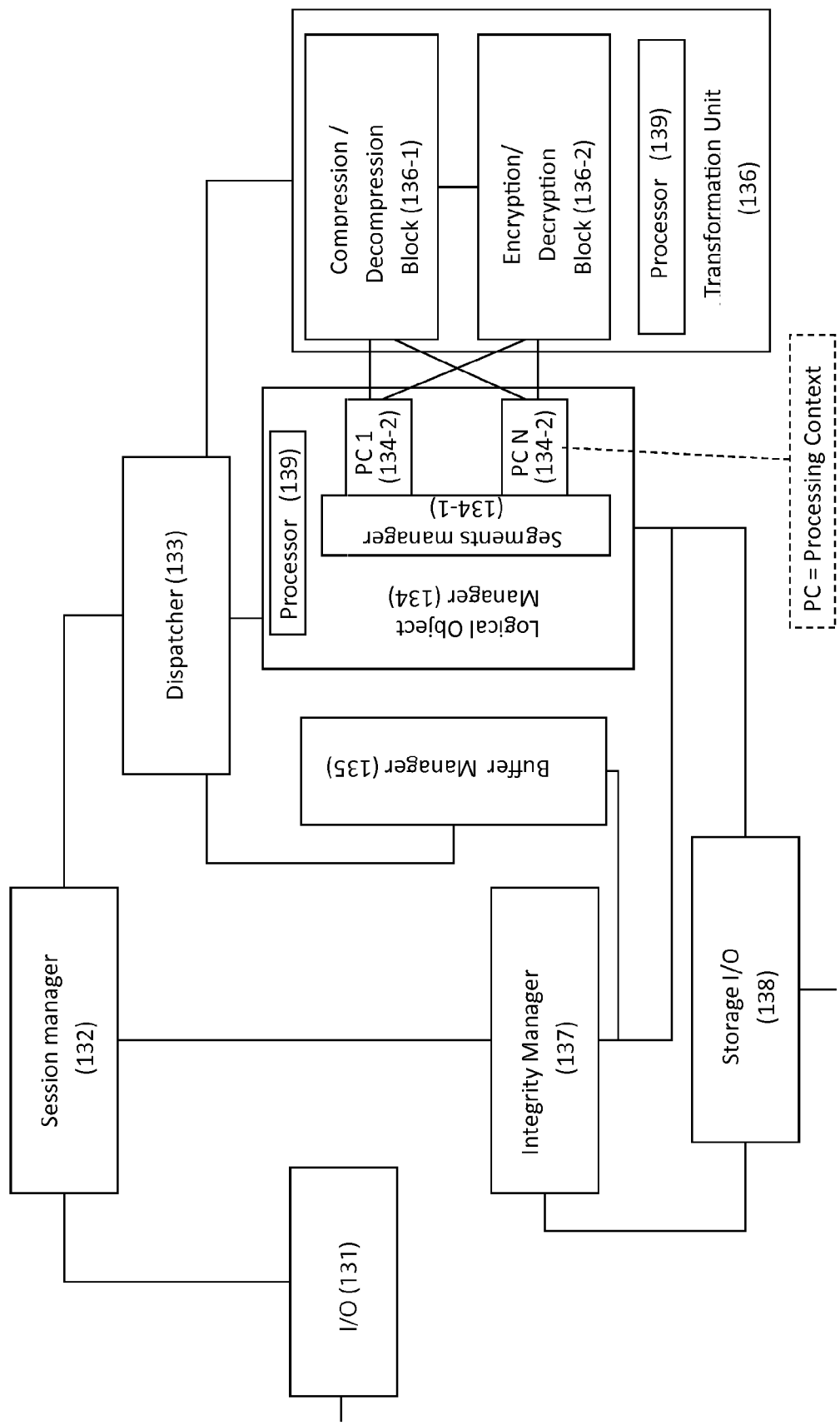
FIG. 2 illustrates a schematic functional block diagram of the transformation system in accordance with certain embodiments of the present invention.

FIG. 2 illustrates a schematic functional block diagram of the transformation system 16 in accordance with certain embodiments of the present invention. The transformation system comprises a Client Input/Output (I/O) block 131 coupled to a session manager 132. The client I/O block gets data access-related requests (e.g. read, write, set end of file/truncate, etc.) from external clients and/or from the maintenance unit 18 and forwards them to the session manager.

A session starts by access request to a logical data object (e.g. LUN capacity request as, for example, SCSI LUN capacity request command; open file request, etc.) and ends by disconnect request (e.g. "LUN disconnect", "close file", etc.) received from the same IP address (user) with regard to the same logical object. The session may handle one or more access requests addressed to the same logical data object (e.g. from multiple applications running on the same client, multiple requests from certain single applications, etc.).

The session manager 132 holds all the session's private data as, for example, source session address, session counters, session status, all instances for the buffers in use, etc. The session manager also handles blocking all the relevant resources when the logical data object is open and releasing said resources on disconnect. The session manager 132 is further configured to manage one or more sessions with access requests addressed to the same logical data object.

The session manager transfers all requests to a dispatcher 133 operatively coupled to the session manager. The dispatcher 133 is operatively coupled to a logical data object manager 134, a buffer manager 135 and a transformation unit 136. The dispatcher 133 communicates with the logical data object manager 134 for data related transactions (e.g. Read, Write, set end of file, etc.) and the transformation unit 136 for transforming operations in accordance with certain embodiments of the present invention.

The transformation unit 136 is capable of compressing, encrypting and/or otherwise transforming data, and sending them to a physical disk through a storage I/O 138; as well as of reading data from the physical disk through the storage I/O, de-transforming (e.g. decrypting and/or decompressing) the respective buffer and, optionally, of segmenting and/or combining original and/or partly transformed data chunks for further processing. The transformation unit 136 may comprise one or more transformation blocks responsible for certain transforming operations (e.g. compression-decompression block 136-1 operatively coupled with the encryption/decryption block 136-2), and is configured to facilitate data transfer and necessary synchronization between said blocks. The transformation unit 136 is also configured to report size of original logical data object (and free storage capacity) in reply to "Capacity status." As one of ordinary skill in the art would appreciate, the transformation unit 136 and the logical object manager 134 may include any variety of hardware device components such as a Central Processing Unit (CPU), a controller, or other hardware components for operations and processing of the transformation unit. The processor 139 is one such hardware component to assist in operation of the transformation unit 136. For example, the processor 139 on the logical object manager 134 may be configured to carry out dividing incoming data corresponding to a logical data object into a plurality of independent streams.

The transformation unit 136 is also configured to communicate with one or more external platforms storing external information related to data involved in the transformation process (e.g. the secure keys for receiving the keys and/or metadata thereof); to receive said the information, extract or generate the necessary data (e.g. key ID) and to manage thereof. The received information may be temporary accommodated in a trusted memory within the transformation system, wherein the transformation unit block may provide a management of said information (e.g. to manage accommodation of certain keys in said memory for certain time period in accordance with a certain policy). In certain embodiments of the invention the encryption/decryption block 136-2 may further generate one or more encryption initialization vectors to be used for encryption (e.g. together with secure keys).

The logical object manager 134 is responsible for the ordering and memory sharing by different logical data objects and parts thereof. The logical object manager 134 includes segment manager 134-1 holding information of write requests being processed by the logical object manager 134 or the transformation unit 136. The segment manager 134-1 is responsible for facilitating association between write requests received from the client and their corresponding processing contexts 134-2. This association is position-based, while the processing contexts 134-2 maintain a time-based state.

The buffer manager 135 manages memory buffer resources and is responsible for allocating and releasing memory buffer for operations of other blocks. The transformation system further comprises an integrity manager 137 coupled to the session manager, the buffer manager and the data block manager. The integrity manager is responsible for synchronization and general control of all processes in the transformation system as, for example keeping the integrity of the logical data objects, etc. It is also responsible for flashing the memory buffer to the physical disk(s) through the storage physical I/O interface 138, and reading when needed from the disk(s).

Those skilled in the art will readily appreciate that the invention is not bound by the configuration of FIG. 2; equivalent and/or modified functionality may be consolidated or divided in another manner and may be implemented in software, firmware, hardware, or any combination thereof.

Thus, in accordance with certain embodiments of the present invention, the method of transforming logical data object (LO) may comprise dividing a logical data object into one or more segments with sequential data, each segment characterized by respective start and end offsets, processing one or more obtained variable size data chunks corresponding to the transforming logical data object thus giving rise to the processed data chunks, wherein at least one of said processed data chunks comprises transformed data resulting from said processing, associating each obtained data chunk with respective segment of the logical object, sequentially accommodating the processed data chunks in accordance with an order said chunks received while keeping said association with corresponding segments, and facilitating mapping between the data in the logical data object and the processed data chunks.

The logical object may be divided in segments in accordance with predefined and/or dynamically adjustable criterion (e.g. predefined size of segments, predefined number of segments, predefined data format for each segment, etc.).

The processing may comprise one or more techniques of data transformation (e.g. compression, encryption, compression together with encryption, etc.) These techniques are coordinated in time, concurrently execute autonomous sets of instructions, and provided in a manner facilitating preserving the sequence of processing and accommodating the processed data chunks. Optionally, data chunks corresponding to different segments may be transformed in different ways (e.g. if segments correspond to different data formats). The mapping may be provided with the help of at least one index section constituting a part of the transformed logical data object, said index section comprising at least one entry holding at least information related to the processed data chunks, their association with respective segments and indication of physical storage location pertaining to said chunks.

Further, the transforming logical data object (LO) may be provided on-the-fly. Accordingly, in accordance with certain embodiments of the present invention, the method may comprise dividing an incoming data corresponding to a logical data object into one or more independent streams, each stream corresponds to a segment in the logical object comprising sequential data and characterized by respective start and end offsets, processing one or more obtained variable size data chunks corresponding to the transforming logical data object thus giving rise to the processed data chunks, wherein at least one of said processed data chunks comprises transformed data resulting from said processing, associating each obtained data chunk with respective stream, sequentially accommodating the processed data chunks in accordance with an order said chunks received while keeping said association with corresponding streams, and facilitating mapping between the data in the logical data object and the processed data chunks.

Figure 3:
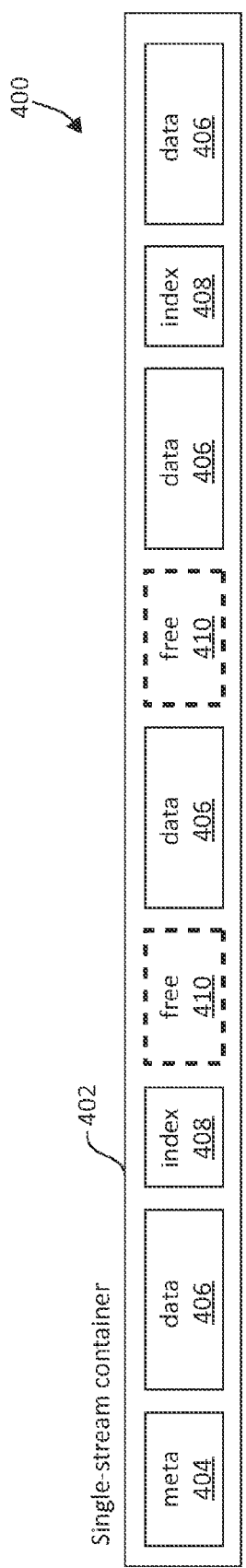
FIG. 3 illustrates a schematic diagram of a single-stream container.

FIG. 3 illustrates a schematic diagram of a single-stream container 402 with metadata 404, data 406, and index 408. The container may include one or more free blocks 410. The single-stream container is adapted to assist in the organizing and maintaining the processed data chunks associated with different segments of a logical object in a single container (transformed LO) sequentially accommodating the processed data chunks in accordance with an order said chunks received. The various components described within the single-stream container 402 may also assist and be utilized with other components show and described in greater detail in other Figures.

Figure 4:
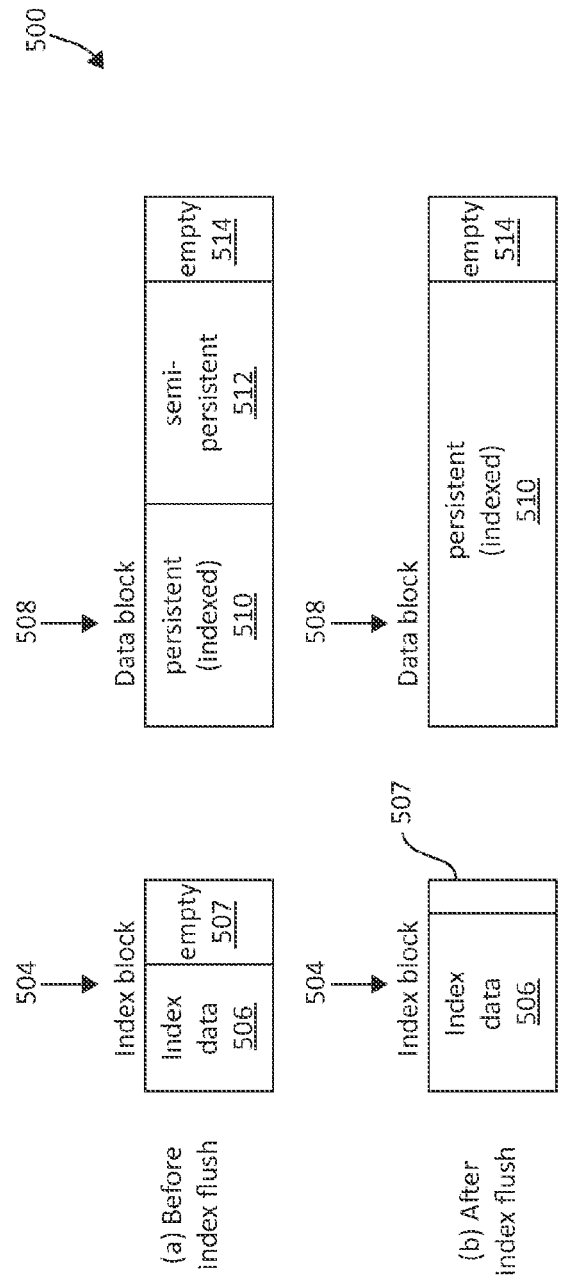
FIG. 4 illustrates a schematic diagram of a data block comprising semi-persistent parts.
Figure 5:
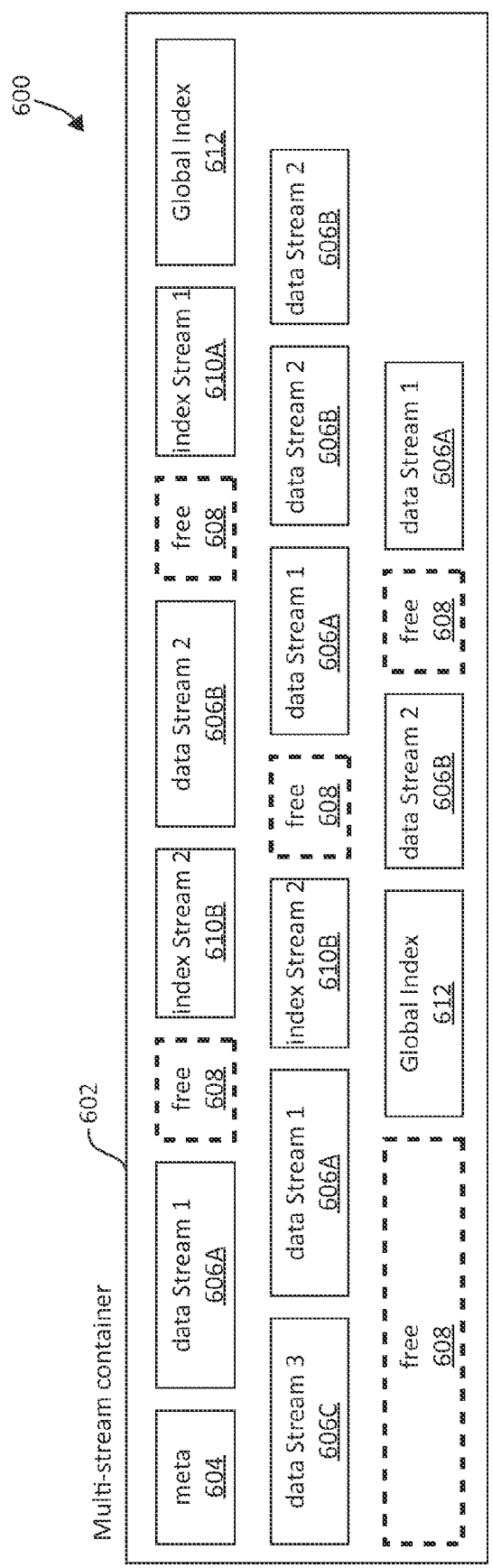
FIG. 5 illustrates a schematic diagram of a multi-stream container in accordance with certain embodiments of the present invention.

In FIG. 4, the term of semi-persistency is schematically illustrated. A data block 508 may contain semi-persistent parts (block) 512, ones that were not written yet to the index block 504. On an index flush event, the semi-persistent parts (block) 512 become persistent. As shown in FIG. 5, prior to an index flush event, an index block 504 with index data 506 and an empty block 507 are shown. The data block 508 is shown containing a persistent (indexed) data block 510, semi-persistent data block 512, and a empty block 514. After an index flush, the index block 504 is illustrated with the index data 506 and the empty block 507. The data block 508 is shown containing a persistent (indexed) block 510 and an empty block 514.

The index block 504 may reside inside a transformed logical data object (LO) and serve as a map to the data pieces in the journaling stream. Often indexes are themselves implemented with journaling, as mentioned above. Since data modifications may be frequent, a fully persistent index 510 may be inefficient to maintain. Therefore, the index block 504 is only flushed to the underlying storage periodically. After failure of the logical data objects to be transformed or indexed, the index block 504 of data that has not been indexed may be reconstructed (recovered) by processing the part of the stream that was about to be indexed.

FIG. 5 schematically shows a multi-stream container in accordance with certain embodiments of the present invention. It consists of metadata (meta) 604, stream-specific data (data) 606A (shown in FIG. 5 as 606A and 606B), and index steam blocks (index stream) 610 (shown in FIG. 6 as 610A and 610B), global index blocks 612, and global free blocks (free). 608. The list of free blocks and the recovery list may be inferred from the global index 612.

The multi-stream container 602 is also adapted to assist in the organizing and maintaining the processed data chunks associated with different segments of a logical object in a single container (transformed LO) sequentially accommodating the processed data chunks in accordance with an order said chunks received. The various components described within the multi-stream container 602 may also assist and be utilized with other components show and described in greater detail in other Figures.

Figure 6:
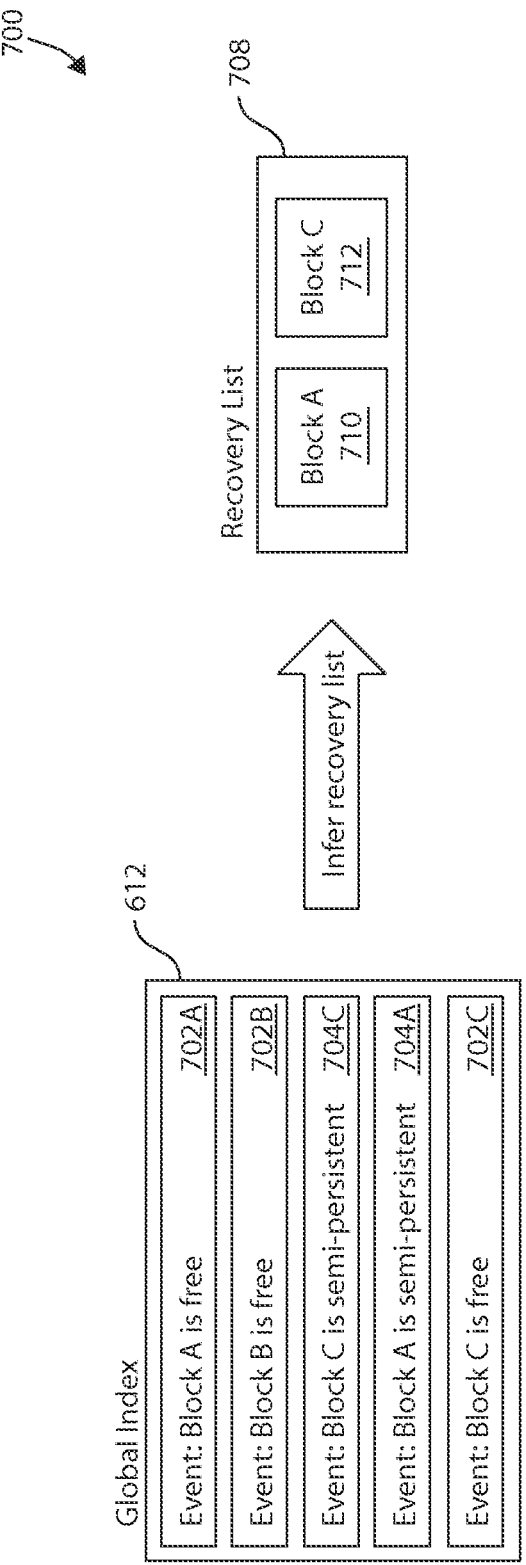
FIG. 6 illustrates a schematic diagram of inferring a recovery list from a list of events in a global index in accordance with certain embodiments of the present invention.

FIG. 6 schematically demonstrates how the recovery list 708 is inferred from the list of events in the global index 612 (FIG. 5). Each block, in the global index 612, that becomes a free block 702 (shown in FIG. 7 as 702A, 702B, and 702C) is appended to the recovery list 708 in block A 710 and/or block C 712, but removed once indexed as a semi-persistent data block 704 (shown in FIG. 6 as 704A and 704C), i.e. no need to recover its index data. The blocks 702 and 704 within the global index 612 may be a free block 702 and/or may be a semi-persistent data block 704.

By the use of Semi-Persistent Free-Block Management protocol, such management enables re-using free data blocks 702 among the separate data streams 606 (shown in FIG. 5 as 606A, 606B, and 606C). The list of free blocks 410 and 608 (as shown in FIG. 3 and FIG. 5) is global to the single and/or multi-stream container 402 and 602 (as shown FIG. 3 and FIG. 5) and constantly changing and may reside in the global index 612 as free data blocks 702. However, since block allocations and de-allocations are frequent, a fully persistent free block 510 (FIG. 4) list may affect performance. By having a semi-persistent global index, we reduce the frequency of global index writes, but the free-block list is not always up-to-date in case a failure has occurred. The global free-block list must be reconstructed after failures, but since there are multiple data streams with semi-persistent data, it is hard to tell which blocks 702 or 704 are free. Also, it may be inefficient to load the entire set of stream indexes. Therefore, in accordance with certain embodiments of the present invention, the global free-block list is inferred from the global index 612 and the semi-persistent data blocks 704, identified in the global index 612. Finding the set of semi-persistent data blocks 710 and 712, called the recovery list 708, is inferred from the order of de-allocation events in the global index 612.

In addition, the bounded data recovery guarantees that the amount of data that has to be processed while reconstructing the stream's index is bounded. In a case of multi-stream bounded recovery the amount of data to be processed during recovery, i.e. the size of the recovery list 708 must be controlled. During operation, the recovery list 708 is presumed and maintained. This recovery list 708 is not used for the recovery process, but maintained only to monitor the future recovery list size in case of failures. When the recovery list 708 is about to be extended beyond the pre-defined recovery bound, an action is taken to shorten it. Such action may be a stream index flush and/or a global index flush. In rare cases where all blocks 710 and 712 in the recovery list are in use, at least one of them has to be discontinued in order to make room for a new block (not shown but additional blocks may be added to the list as needed) in the list.

Figure 7:
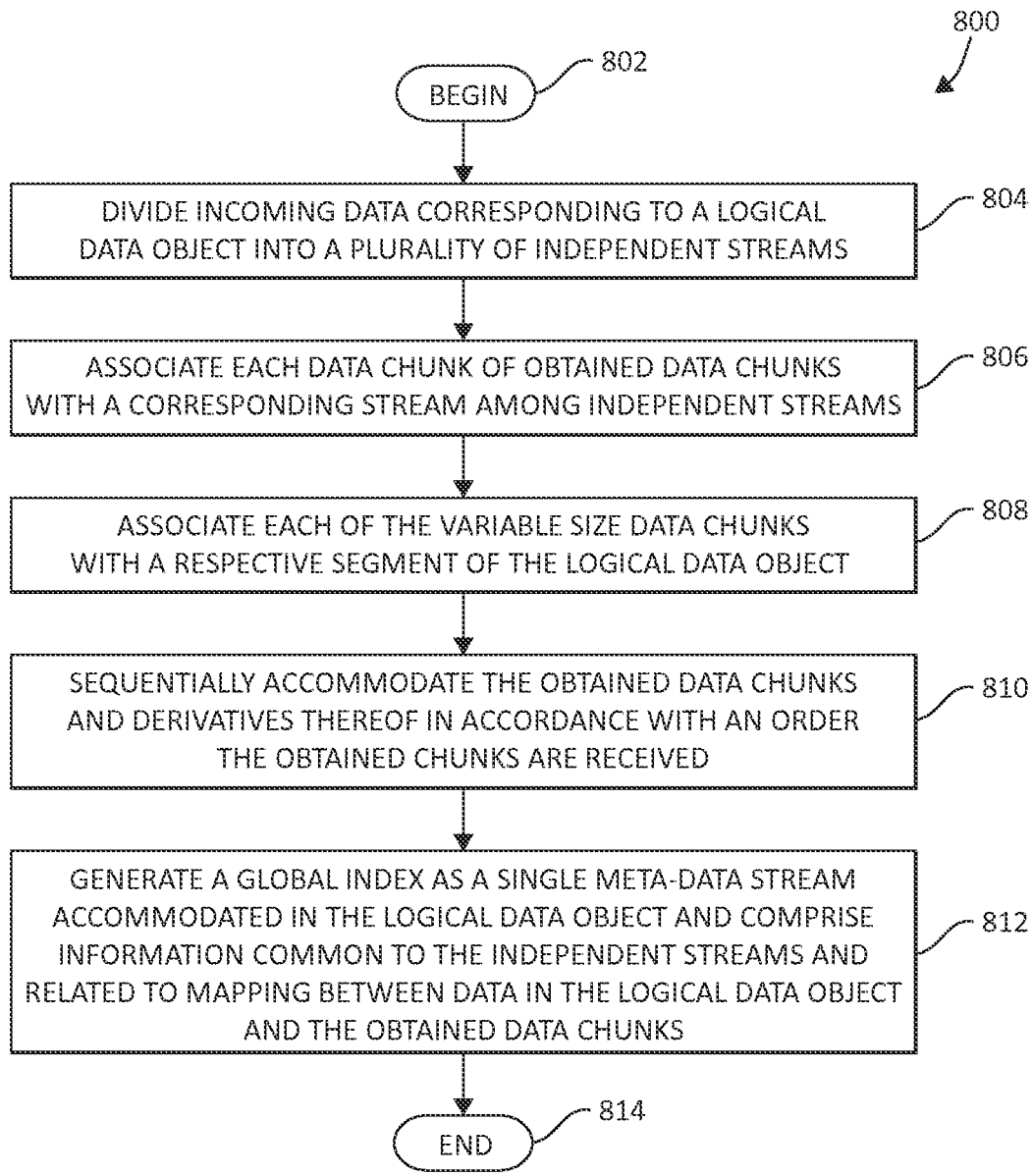
FIG. 7 illustrates a flow chart diagram of en exemplary method of storing a logical object in a computing environment by a processor device.

FIG. 7 illustrates a flow chart diagram of en exemplary method 800 of storing a logical object in a computing environment by a processor device. The method 800 begins (step 802) and divides incoming data corresponding to a logical data object into a plurality of independent streams (step 804). The method 800 will associate each data chunk of obtained data chunks with a corresponding stream among independent streams (step 806) and associate each of the variable size data chunks with a respective segment of the logical data object (step 808). The obtained data chunks and derivatives thereof are sequentially accommodated in accordance with an order the obtained chunks are received (step 810). A global index is generated as a single meta-data stream accommodated in the logical data object and comprise information common to the independent streams and related to mapping between data in the logical data object and the obtained data chunks (step 812). The method 800 ends (step 812).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A method for storing a logical object in a distributed network, comprising:
   dividing, by a processor, incoming data corresponding to a logical data object into a plurality of independent streams;
   associating each data chunk of a plurality of obtained data chunks with a corresponding stream among the plurality of independent streams;
   transforming each data chunk;
   generating a global index as a single meta-data stream accommodated in the logical data object and comprising information common to each of the plurality of independent streams and related to mapping between data in the logical data object and the obtained data chunks, wherein the information comprises one of block allocation events, block de-allocation events, and a starting point of index streams for each independent stream;
   storing, in a transformed logical data object, indexed data in the global index as persistent data in a first portion of a data block;
   storing, in the transformed logical data object, non-indexed data in the global index as semi-persistent data in a second portion of the data block; and
   reusing free data blocks corresponding to different data streams using semi-persistent free-block management.

2. The method of claim 1, further including generating a recovery list including semi-persistent data blocks, the recovery list derived from one of an order of allocations and an order of de-allocation events in the global index.

3. The method of claim 2, further including generating a global free-block list derived from the global index and the recovery list.

4. The method of claim 3, further including using the global free-block list for reusing free data blocks corresponding to different ones of the plurality of independent streams.

5. The method of claim 2, further including controlling the size of the recovery list.

6. The method of claim 5, wherein controlling the size of the recovery list further includes performing at least one of flushing the global index and flushing at least one stream index responsive to achieving a predefined event.

7. A system of storing a logical object in a distributed network, comprising:
   a processor, operable in the distributed network, wherein the processor is configured for:
      dividing incoming data corresponding to a logical data object into a plurality of independent streams,
      associating each data chunk of a plurality of obtained data chunks with a corresponding stream among the plurality of independent streams,
      transforming each data chunk,
      generating a global index as a single meta-data stream accommodated in the logical data object and comprising information common to each of the plurality of independent streams and related to mapping between data in the logical data object and the obtained data chunks, wherein the information comprises one of block allocation events, block de-allocation events, and a starting point of index streams for each independent stream,
      storing, in a transformed logical data object, indexed data in the global index as persistent data in a first portion of a data block,
      storing, in the transformed logical data object, non-indexed data in the global index as semi-persistent data in a second portion of the data block, and
      reusing free data blocks corresponding to different data streams using semi-persistent free-block management.

8. The system of claim 7, wherein the processor device is further adapted for generating a recovery list including semi-persistent data blocks, the recovery list derived from one of an order of allocations and an order of de-allocation events in the global index.

9. The system of claim 8, wherein the processor device is further adapted for generating a global free-block list derived from the global index and the recovery list.

10. The system of claim 9, wherein the processor device is further adapted for using the global free-block list for reusing free data blocks corresponding to different ones of the plurality of independent streams.

11. The system of claim 8, wherein the processor device is further adapted for controlling the size of the recovery list.

12. The system of claim 11, wherein the processor device is further adapted for, pursuant to controlling the size of the recovery list, performing at least one of flushing the global index and flushing at least one stream index responsive to achieving a predefined event.

13. A computer program product for storing a logical object by a processor, the computer program product comprising a computer-readable storage memory including computer-readable program code portions stored therein, the computer-readable program code portions comprising:

computer code for dividing, by a processor, incoming data corresponding to a logical data object into a plurality of independent streams;

computer code for associating each data chunk of a plurality of obtained data chunks with a corresponding stream among the plurality of independent streams;

computer code for transforming each data chunk;

computer code for generating a global index as a single meta-data stream accommodated in the logical data object and comprising information common to each of the plurality of independent streams and related to mapping between data in the logical data object and the obtained data chunks, wherein the information comprises one of block allocation events, block de-allocation events, and a starting point of index streams for each independent stream;

computer code for storing, in a transformed logical data object, indexed data in the global index as persistent data in a first portion of a data block;

computer code for storing, in the transformed logical data object, non-indexed data in the global index as semi-persistent data in a second portion of the data block; and computer code for reusing free data blocks corresponding to different data streams using semi-persistent free-block management.

14. The computer program product of claim 13, further comprising computer code for generating a recovery list including semi-persistent data blocks, the recovery list derived from one of an order of allocations and an order of de-allocation events in the global index.

15. The computer program product of claim 14, further comprising computer code for generating a global free-block list derived from the global index and the recovery list.

16. The computer program product of claim 15, further comprising computer code for using the global free-block list for reusing free data blocks corresponding to different ones of the plurality of independent streams.

17. The computer program product of claim 14, further comprising computer code for controlling the size of the recovery list.

18. The computer program product of claim 17, further comprising computer code for, pursuant to controlling the size of the recovery list, performing at least one of flushing the global index and flushing at least one stream index responsive to achieving a predefined event.

* * * * *